Figure 1:
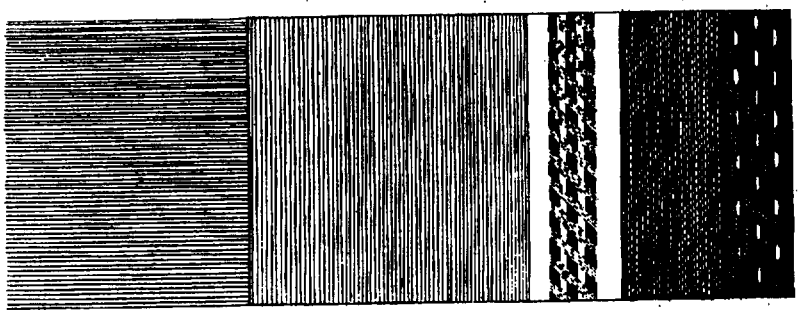
Figure 2:
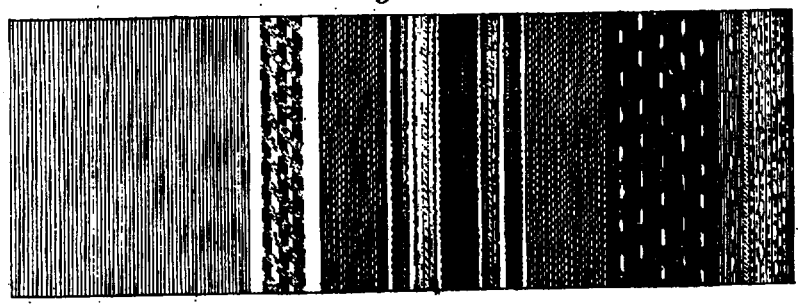
Figure 3:
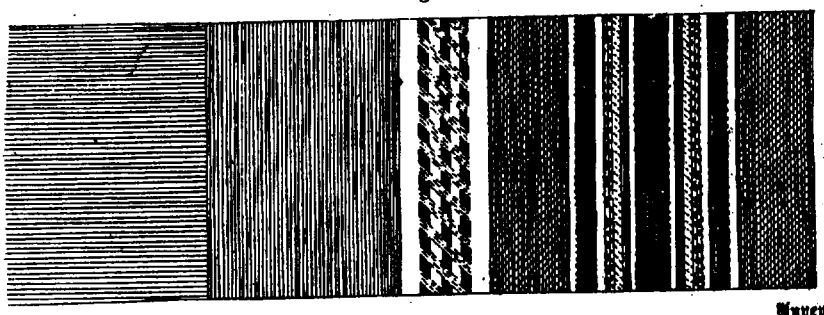

M. LANDENBERGER.
*Design for Shawls.*
4249
REISSUED JAN 31 1871
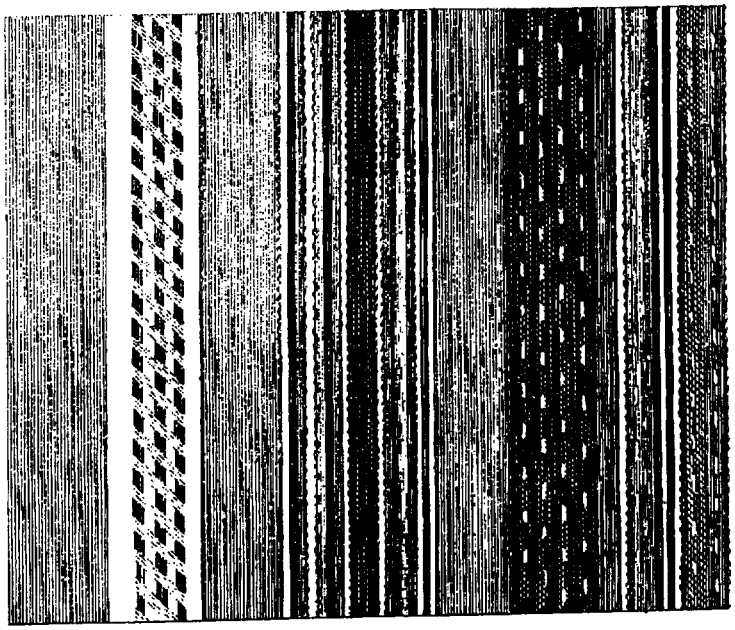
Witnesses.
T. C. Brecht.
A. N. Mear
Inventor.
M. Landenberger
per Alexander Milne
Atty.

M. LANDENBERGER.

Design for Shawls.

Witnesses.

C. L. Everts

A. H. Marr

Inventor.

M. Landenberger per Alexander & Malon

Attys.

United States Patent Office.

MARTIN LANDENBERGER, OF PHILADELPHIA, PENNSYLVANIA.

Design No. 4,233, dated July 19, 1870; reissue No. 4,249, dated January 31, 1871.

DESIGN FOR A SHAWL.

The Schedule referred to in these Letters Patent and making part of the same.

*To all whom it may concern:*

Be it known that I, MARTIN LANDENBERGER, of Philadelphia, in the county of Philadelphia and State of Pennsylvania, have invented a new and useful Design for Shawls; and I do hereby declare the following to be a full, clear, and exact description thereof, reference being had to the accompanying drawing and to the letters of reference marked thereon forming part of this specification.

This design consists in the use of certain peculiar stripes which give character to an entire line of shawls. These stripes may be varied in size, in color, or in location, to an indefinite degree, yet the general appearance, or character, or design will not be materially changed.

In the drawing—

A represents a plain stripe;
B, a checkered stripe;
C, a plain one;
D, a zigzag stripe; and
E represents several speckled stripes.

The checkered or spotted and the plain stripes, when used together, give a peculiar appearance and a marked character to the shawl.

It is evident that there may be a great many combinations of these stripes. They may be interchanged, made different in width and color, and may be grouped so that various tastes may be gratified, and still the design will be preserved.

What I claim as new, and desire to secure by Letters Patent, is—

1. The within design for shawls, substantially as herein set forth.
2. The checkered, the spotted, and the plain stripes of a shawl, combined substantially as set forth.
3. The spotted or speckled, zigzag, and checkered stripe, in combination with the plain stripe, as is herein set forth.

In testimony that I claim the foregoing I have hereunto set my hand this 16th day of December, 1870.

MARTIN LANDENBERGER.

Witnesses:
C. L. EVERT,
A. H. MARR.